US006042766A

United States Patent [19]

Bahr

[11] Patent Number: 6,042,766

[45] Date of Patent: Mar. 28, 2000

[54] METHOD OF FORMING ARTIFICIAL ROCK SHEATHING

[76] Inventor: Gregory J Bahr, 726 N. Rodd, Bethel, Vt. 05032

[21] Appl. No.: 08/958,503

[22] Filed: Oct. 27, 1997

[51] Int. Cl.[7] .................................................... B29C 44/06

[52] U.S. Cl. .......................... 264/46.6; 29/460; 264/161; 264/220; 264/225

[58] Field of Search .................................. 264/46.6, 220, 264/225, 161; 29/460

[56] References Cited

U.S. PATENT DOCUMENTS

| | | | |
|---|---|---|---|
| 3,950,477 | 4/1976 | Di Giacomo | 264/226 |
| 4,668,451 | 5/1987 | Langson | 264/225 |
| 4,847,026 | 7/1989 | Jarboe et al. | 264/225 |
| 4,940,558 | 7/1990 | Jarboe et al. | 264/225 |
| 4,953,848 | 9/1990 | Braustein et al. . | |
| 5,395,577 | 3/1995 | Gorski | 264/227 |
| 5,443,774 | 8/1995 | Kluh et al. | 264/225 |

*Primary Examiner*—Allan R. Kuhns
*Attorney, Agent, or Firm*—G. E. Kersey

[57] ABSTRACT

Apparatus and method for the fabrication of semi-flexible artificial rock sheathing; a one-coat silicone elastomer is brushed or sprayed upon the surface of a substantially flat natural rock formation to form a mold that is adhered to a wood-framed fiberglass cradle that hold the shape of the mold; when removed from the rock formation, the mold is sprayed with a thermoplastic elastomer to form a semi-flexible rock sheathing having the same characteristics as the natural rock surface from which the mold was formed; after the materials are fully cured, the sheathing sheet may be separated from the mold and used for the fabrication of rock, rock structures, by attaching sheathing sheets to the exterior of a framework, followed by cutting and forming different shapes.

4 Claims, 7 Drawing Sheets

METHOD OF FORMING ARTIFICIAL ROCK SHEATHING

This invention relates to artificial rocks, and their method of formation, and more particularly, to tire formation of semi-flexible rock sheathing with the characteristics of a natural rock surface.

Rocks and rock-like materials are commonly used in construction and in many types of structures. When in their natural form, rocks often must be obtained from out-of-way places with considerable difficulty and expense before being transferred to a user site. The difficulties associated with the use of natural rocks are compounded when rocks of appreciable size are required. The result can be time consuming and expensive particularly when it is difficult to obtain rocks having the desired surface texture.

Because of the problems associated with the use of natural rocks, it has become common practice to make rocks artificially. In one prior art process, a liner mold of latex rubber is formed over the surface of a natural rock in its natural setting. A framework is placed about the rock and liquid urethane is poured in to cover the liner mold to above its highest point.

When the urethane hardens, it provides a rigid support for the rubber liner, which is then transported to the user site where a batch of concrete or other structure material, such as fiberglass or urethane, is poured into the liner cavity. After the concrete hardens and is lifted out of the cavity, its surface resembles that of natural rock.

This process is cumbersome and time consuming, particularly when there is a considerable distance between the user site and the location of the rock surfaces that are to be simulated. When differently shaped rocks are desired, a number of different liner molds are needed, each made from a different natural rock.

Accordingly, it is an object of the invention to facilitate and simplify the formation of artificial rock surfaces.

Another object of the present invention to eliminate the need for having a separate liner and support mold for each differently shaped or contoured rock.

Still other prior art for the artificial formation of rocks is to use a single rubber film mold for a large number of different rocks which have common characteristic markings, but differ in overall contour and appearance.

In this process, several coatings of liquid latex are applied on the surface of a natural rock to form a rubber film mold having markings characteristic of natural formation and weathering. The rubber film mold is removed from the natural rock and supporting elements are distributed beneath the rubber film mold to shape its impressed surface with a desired overall contour. A first filling of concrete is poured onto the impressed surface of the rubber film mold and is separated after the concrete has hardened. Thereafter the supporting elements beneath the rubber film mold are redistributed to shape the impressed surface with a second, different contour. This procedure is repeated for the number of different desired contours.

This procedure also is costly and cumbersome as are other similar procedures of the prior art.

In general, the mold processes of the prior art for the fabrication of artificial rocks require a natural rock or rock surface. When the mold is removed and readied for fabrication of manufactured rocks, a mold cavity or semi-sphere shape has been produced, and the materials being used have to be sprayed or poured into the mold. Once the artificial rock is demolded, because of its semi-spherical shape, there is restricted facility for changing its form or shape. The materials of the past methods, such as poured cement, are bulky. Not only is heavy equipment is needed for movement, there is no capability for shape change. The past methods all use cavity or semi-spherical molds. As a result, excess materials are needed to cover undercut crevices in the style of mold being used. When the materials are cured and demolded, the products are semi-spherical, having a standard size and shape of the original. Consequently, there is little or no capability for a change in shape or style.

Accordingly, it is yet another object of the invention to overcome the difficulties of the prior art and achieve cost savings and simplicity in the formation of artificial rock structures. A further object of the invention is to meet the high standards needed for realism and quality required by theaters, museums, and amusement industries.

SUMMARY OF THE INVENTION

In accomplishing the foregoing and related objects, the invention provides for meeting the high standards needed for realism and quality required by theaters, museums, and amusement industries by using substantially flat, semi-flexible rock sheathing.

In accordance with the invention, a single mold member, illustratively of a silicone elastomer, can be surface sprayed or cast with a sheath coating, which desirably is fire retardant, semi-flexible and thermoplastic. The surface of the mold member can be impregnated with a fire-retardant base coat. After curing of the sheath coating, it is separated from the mold member.

The resulting product is a substantially flat, artificial rock sheathing master with a thickness that is desirably in the range from ⅛ to ¼ inches. The master and copies of the flat, artificial rock sheathing can be cut, sized and formed into different shapes and contours by attachment to a framework and forming custom rock and rock structures with different dimensions. These structures, which can be made dimensionally different, can be permanently installed or fabricated for easy transportation and storage and use in temporary displays.

In generally accomplishing the objects of the invention, and related objects, the invention provides apparatus for the molding of material comprising a layer of material with a surface having detailing therein, and a support material upon and in surface contact with the layer of material.

In accordance with one aspect of the invention the support material constitutes a cradle layer supported by a frame and disposed upon the layer of material, which can be of silicone elastomer. The cradle layer can be of polyester reinforced by fiberglass.

In accordance with another aspect of the invention, the layer of material has a periphery and the frame is connected to the periphery at a plurality of locations thereof.

In accordance with a further aspect of the invention, a sheathing is formed on the layer of material bearing the complementary detailing thereof.

The sheathing constitutes a segment that can be removed from the layer of material and applied to a framework, which can be multi-dimensional with a plurality of facial subframes, with the sheathing segment is adhered to one of said subframes. Another sheathing segment can be adhered to another of the subframes in contact with an edge of a further sheathing segment and forming a ridge therewith. When all of the subframes are covered with sheathing segments, each forms a ridge with an adjoining sheathing segment and the framework has an interior filled with material.

In accordance with a still further aspect of the invention, each ridge is cut to a prescribed pattern and the filling material of the cavity is foam to add weight and stability to the sheathed framework.

In a method of preparing for the creation of an artificial structure pursuant to the invention, the steps include (a) applying a mold coating to an original surface having prescribed detailing; (b) superimposing a cradle upon the mold coating and coextensive therewith; and (c) attaching a frame to the cradle and coextensive therewith.

In accordance with one aspect of the method, the mold coating, cradle and frame are separated from the original surface, and a sheath coating is applied to the mold coating to receive prescribed detailing therefrom, complementing the detailing created by the original surface on the mold coating.

In accordance with a further aspect of the method, the sheath coating is separated from the mold coating and forms a sheathing segment adhered to a subframe of an overall framework. Duplicates of the sheath coating form sheathing segments adhered to the remaining subframes of the framework to create a sheathing covered framework having a cavity therein.

The method further includes the step of filling the cavity with foam to stabilize the framework structure and add weight to it. The foam forms seams where the sheathing segments overlap, and the seams are trimmed to form a second prescribed pattern.

DESCRIPTION OF THE DRAWINGS

Other aspects of the invention will become apparent after consideration of several illustrative embodiments taken in conjunction with the drawings, in which.

DETAILED DESCRIPTION

Figure 1A:
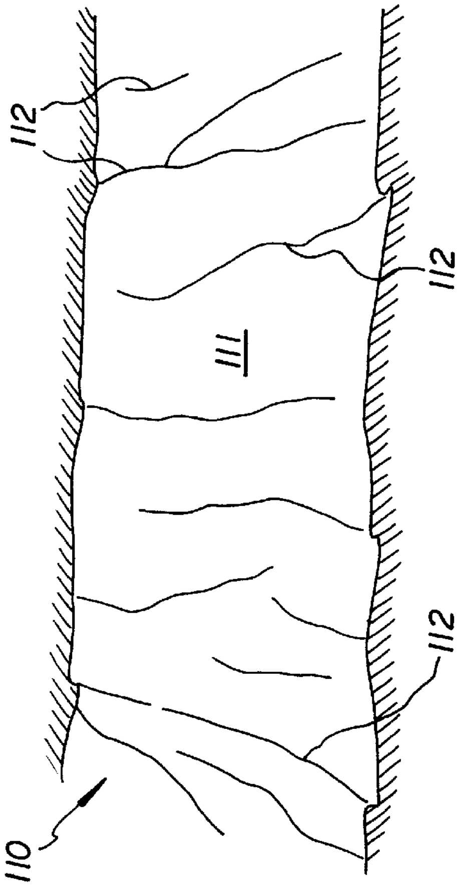
FIG. 1A is a frontal view of a natural rock cliff formation located in its natural setting.
Figure 1B:
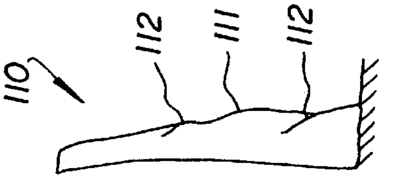
FIG. 1B is a side view of the cliff formation of FIG. 1A.

With reference to the drawings, a natural rock cliff formation 110 as shown in FIG. 1A is elected for ease of accessibility for mold fabrication, and a surface 111 is chosen for "flatness", but having defined natural detailing 112 as indicated in the side view of FIG. 1B and the face view of FIG. 1A.

The formation 110 is chosen in a natural setting away from residential areas with characteristic surface detailing or markings 112 that are typical of the location for the formation 110. The markings 112 may be the result of natural forces, as well as weathering and erosion.

Figure 2A:
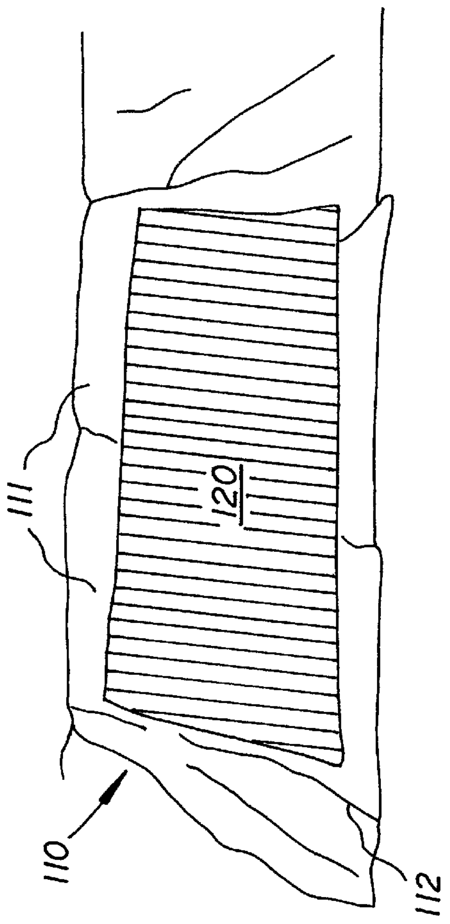
FIG. 2A is a view showing a silicone mold formed on the rock formation of FIG. 1A by applying liquid silicone on the surface thereof.
Figure 2B:
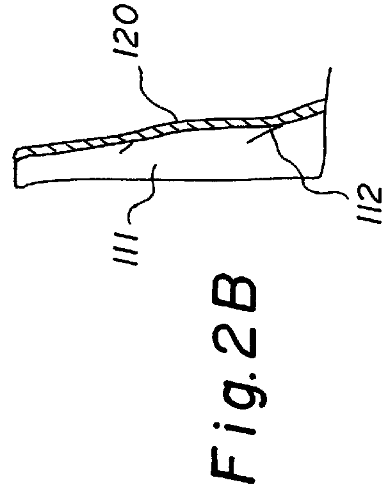
FIG. 2B is a side view of FIG. 2A showing the silicone layer formed on the rock formation of FIG. 1B.

In accordance with the invention, before making a mold of the surface 111, it is first prepared by the removal of loose dirt, moss and other loose particles. A mold material 120, such as a two-component, one-step "silicone", is applied to the natural rock cliff formation 110, either by hand or by spraying as indicated in FIG. 2A. The size of the mold 120 may vary in accordance the area of the surface 111 of the rock formations 110, as shown in the side view of FIG. 2B and the face view of FIG. 2A.

The material of the mold 120 should have sufficiently high viscosity so that it can be brush-coated on vertically inclined surfaces without runs or sags.

Figure 3A:
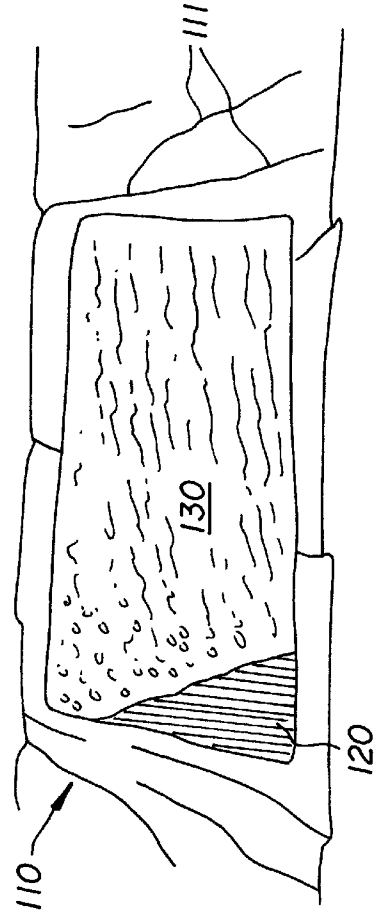
FIG. 3A is a view showing a fiberglass cradle formed on the silicone mold surface of FIG. 2A.
Figure 3B:
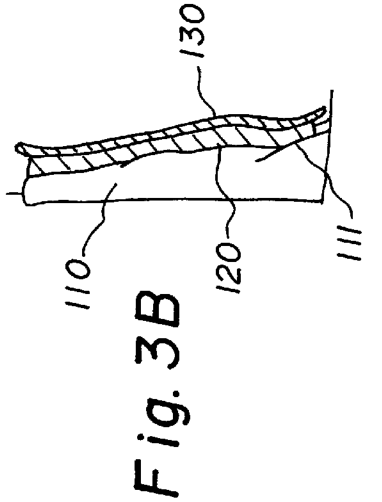
FIG. 3B is a side view of FIG. 3A showing the fiberglass cradle formed on the silicone layer of FIG. 2B.

After the coating of the mold 120 has dried, a mold cradle 130, such as fiberglass-reinforced polyester, is applied to the surface of the mold 120, with the result shown in FIG. 3A, where a portion of the 120 has been left uncovered to indicate the relationship between the cradle 130 and the mold 120. In practice the entire surface of the mold 120 is covered by the support or cradle 130, for example by hand lay-up sheets or by spraying with chopper equipment. The result is shown in the side view of FIG. 3B and the cut-away face view illustration of FIG. 3A.

Figure 4A:
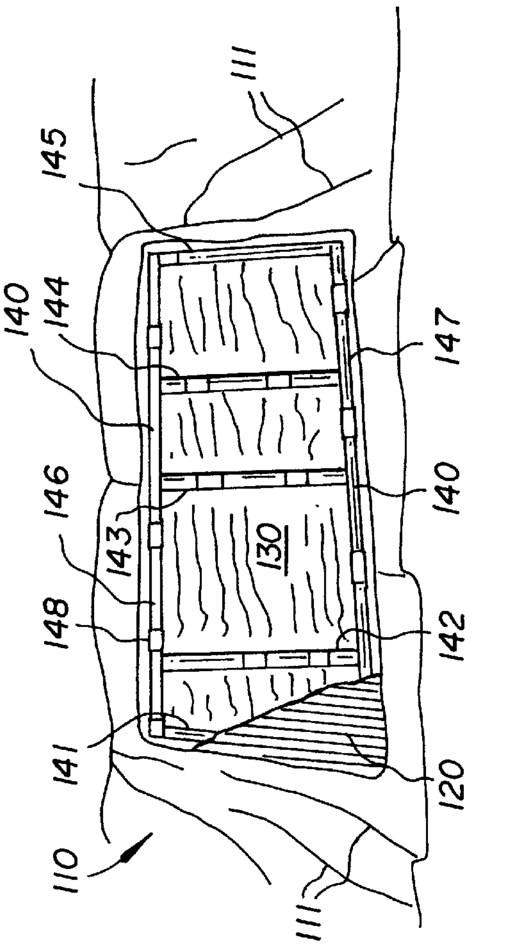
FIG. 4A is a view showing a structural frame for stabilizing the cradle of FIG. 3A.
Figure 4B:
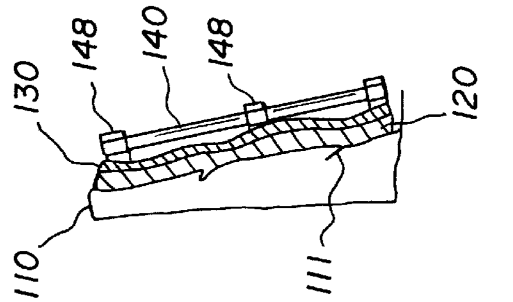
FIG. 4B is a side view of FIG. 4A.

As shown in FIG. 4A and 4B, a frame 140 may be applied, depending on the size of the cradle 130, to help stabilize the combination of mold 120 and cradle 130 and make them easier to move and store. The illustrative frame 140 can be of wood sized to the cradle 130, with legs 141 through 145 between an upper rail 146 and a lower rail 147. The legs 141 and 145, together with the rails 146 and 147 extend around the periphery of the mold-cradle combination 120–130. Strips 148 of reinforcement, such polyester fiberglass, can be placed over the frame 140 and attached to the cradle 130 at various points, such as 131–133 as shown in FIG. 4B to secure the frame 140 to the cradle 130. As in FIG. 3A, FIG. 4A is a cutaway view.

Figure 5:
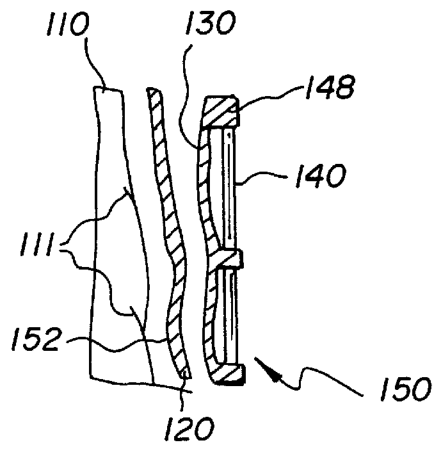
FIG. 5 is a side view of FIG. 4B showing the removal of the fiberglass cradle and the silicone mold.

As a result, the cradle 130, the frame 140 and the reinforcement strips 148 form a reinforced cradle 150 shown, in FIG. 5, removed from the mold 120.

While FIG. 5 also shows the mold 120 separated from the rock surface 110, the mold 120 and the reinforced cradle 150 can be removed from the surface 110 as a unit. Where separation takes place, it is desirable to return the mold 120 to its original position on the reinforced cradle 150 as shown in FIG. 6 to facilitate further processing of the mold 120 in order to form the artificial rock surfaces that are provided by the invention.

Figure 6:
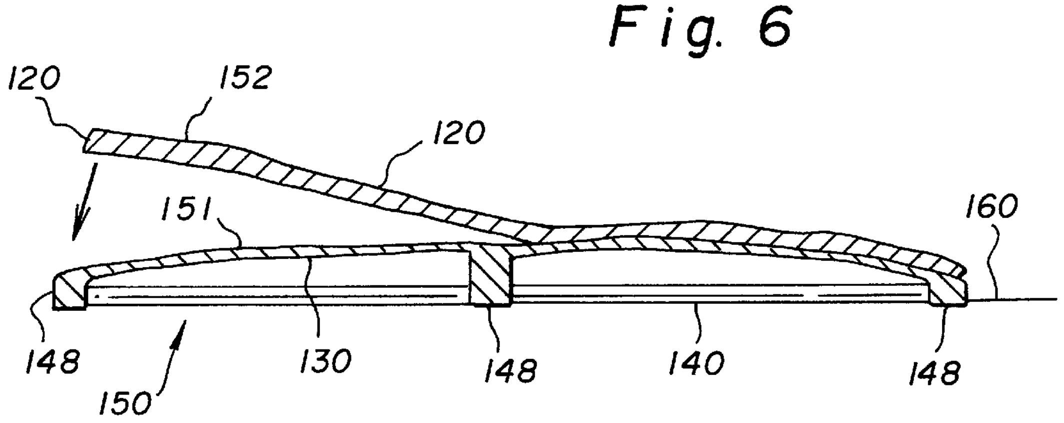
FIG. 6 is a view of FIG. 5 showing the fiberglass cradle positioned on a horizontal surface with the silicone mold placed upon the cradle.

In FIG. 6 the reinforced cradle 150 has been set on a horizontal surface 160, such as a floor, with the mold 120 laid upon the surface 151, making certain that bumps and/or rises are located at their proper positions 152, as shown in the cross-sectional illustration of FIG. 5. This defines the flat or semi-flat surface that is to be reproduced by the mold 120.

Figure 7:
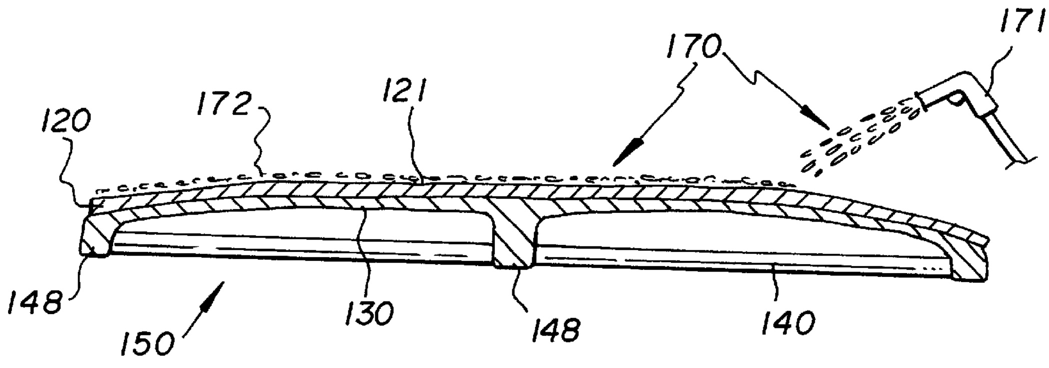
FIG. 7 is a view of FIG. 6 showing the silicone mold being sprayed with a fire retardant primer.

After the mold 120 has been check for correct positioning, the surface 121 of the mold 120 is treated as indicated in FIG. 7 with a primer 170, such as a Class 1 fire-retardant base coat. The treatment can be by spraying, for example with the gun 171 of an airless spray system. This produces a barrier coat 172 for easy separation from the mold 120 of the sheathing 180 that is produced by the mold 120.

Figure 8:
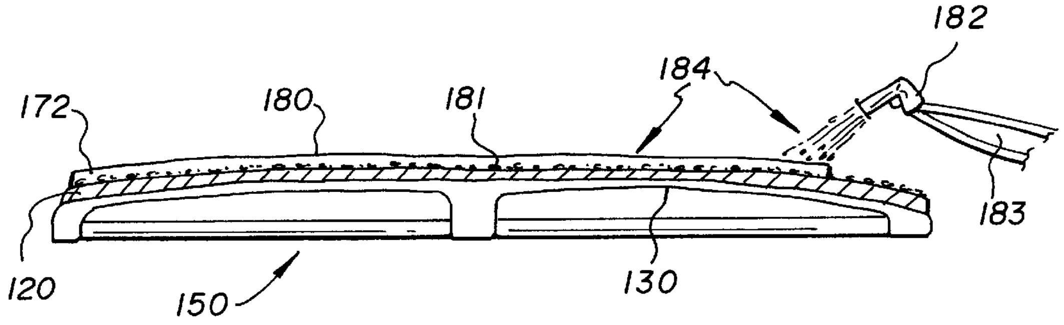
FIG. 8 is a view of FIG. 7 showing the application of a fire retardant thermoplastic coating.

The barrier coat 172 also impregnates the surface 181 of the sheathing 180, for example of semi-flexible thermo plastic formed, for example by spraying with the gun 182 of a plural component system 183, as shown in FIG. 8.

The sheathing 180 is applied as a coating after the drying of the primer 170 by spraying or by surface pouring, depending upon the choice of the operator in seeking to produce a finished semi-flexible rock sheathing 180 with a thickness that can average from ¼ to ½ inches.

Figure 9:
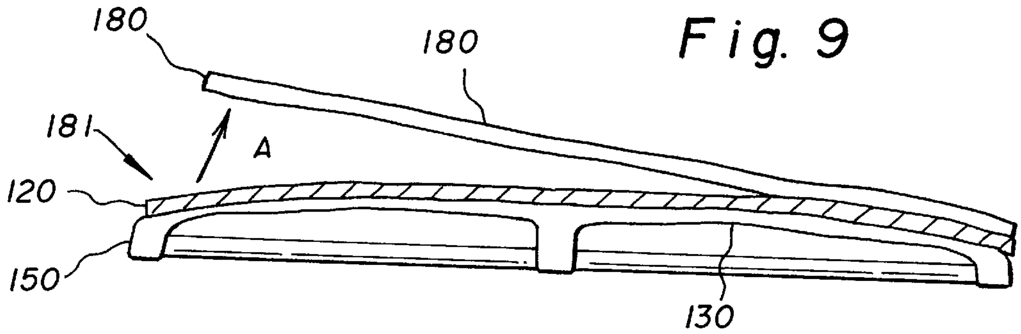
FIG. 9 is a view of FIG. 8 showing the demolding of the sheathing formed by spraying from the silicone mold.

After curing of the sheathing 180, it is demolded as shown in FIG. 9 starting, as indicated by the arrow A, from one side 191 and slowly separating the sheathing 180 from the mold 120 until the sheathing 180 has been completely released.

Following demolding, the mold 120 is set back to its proper position in the reinforced cradle 150 in order to help keep its proper shape for storage or to repeat the foregoing process to produce another sheathing.

Figure 10B:
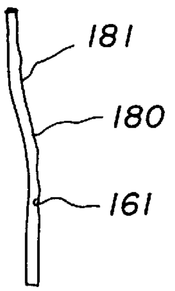
FIG. 10B is a side view of FIG. 10A.
Figure 10A:
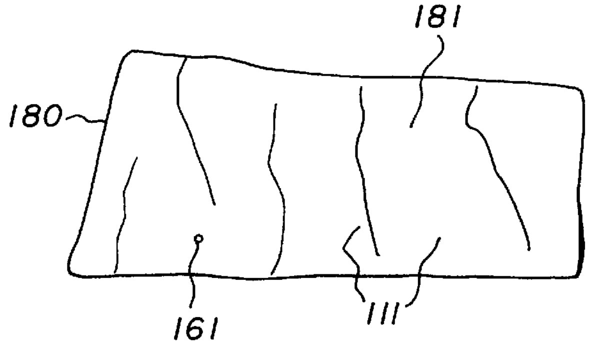
FIG. 10A is a view of a thin flat rock sheathing after removal from the silicone mold of FIG. 9.

Upon completion of the foregoing process illustrated by FIGS. 1A through 9, the result as shown in FIGS. 10A and 10B is a relatively thin sheathing 180, which is fire-retardant, semi-flexible and in the form of a flat rock, as shown in the side view of FIG. 10B and the face view of FIG. 10B. A fire-retardant colored base paint primer 161 is impregnated into the sheathing surface 181 to help keep it scratch and scuff resistant, while capturing the flat-rock surface 111 and detailing from the master silicone mold 120 and reinforced cradle 150 that was used to replace the natural rock cliff formation 110.

By virtue of having the semi-flexible artificial rock sheathing 180, there are endless possibilities as in cutting, shaping, and seaming to produce custom rocks and rock structures that are light, impact-resistant and have differing sizes, shapes and contours.

Figure 11:
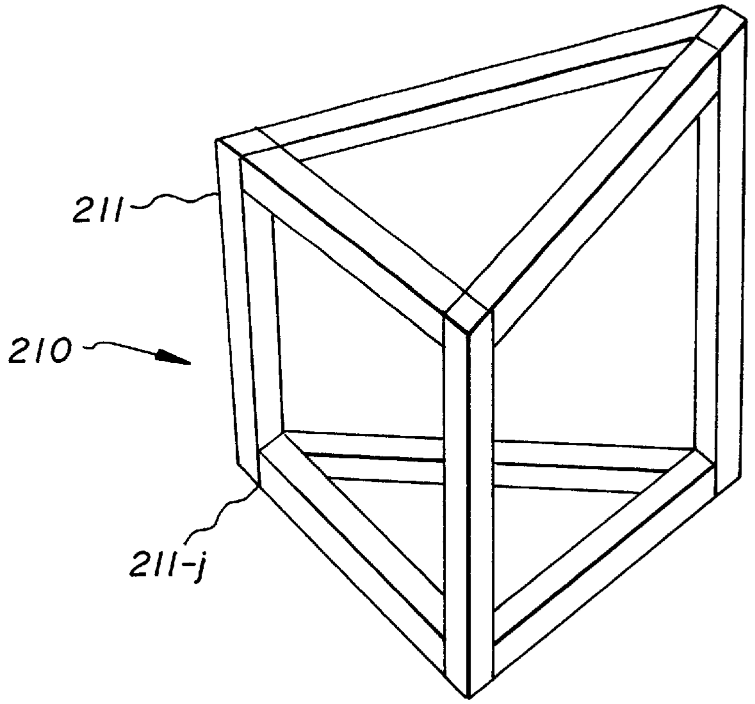
FIG. 11 is a view of a frame work for transforming the sheathing of FIG. 10A into a dimensional rock structure.

In one technique of the invention for producing differing custom rock structures, a structure framework 210 as shown FIG. 11 can be used. The structure framework 210 is fabricated for the transformation of the fire-retardant semi-flexible rock sheathing 180 into a three-dimensional rock or rock structure.

The framework 210 of FIG. 11 is formed by cutting stock into members 211 which are connected at joints 211-j, for example, by nails, screws or welding using such materials as wood, aluminum, or steel. The created framework 210 illustratively is dimensioned to one specific size simulating the interior of a desired rock structure.

Figure 12:
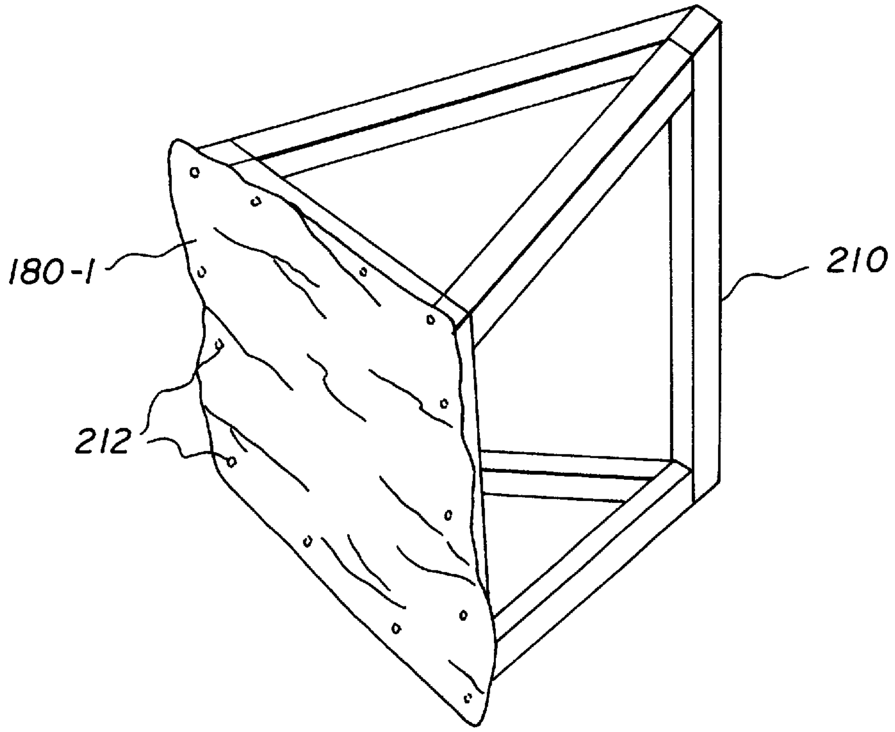
FIG. 12 is a view of FIG. 11 with the sheathing of FIG. 10A attached.

As shown in FIG. 12, a sheet 180-1 of the fire-retardant, semi-flexible rock sheathing 180, having the surface texture needed to achieve the appropriate look and style of the rock or structure that is to be fabricated, is attached in conventional fashion to one subordinate frame of the framework 210 with extra inches of rock sheathing 180-1 to overlap the framework, illustratively two or three inches of extension. In an illustrative embodiment of the invention rock sheathing 180-1 was placed upon the framework 210 and attached with standard self-tapping screws 212 at various points where the rock sheathing 180-1 touches the interior framework 210.

Figure 13:
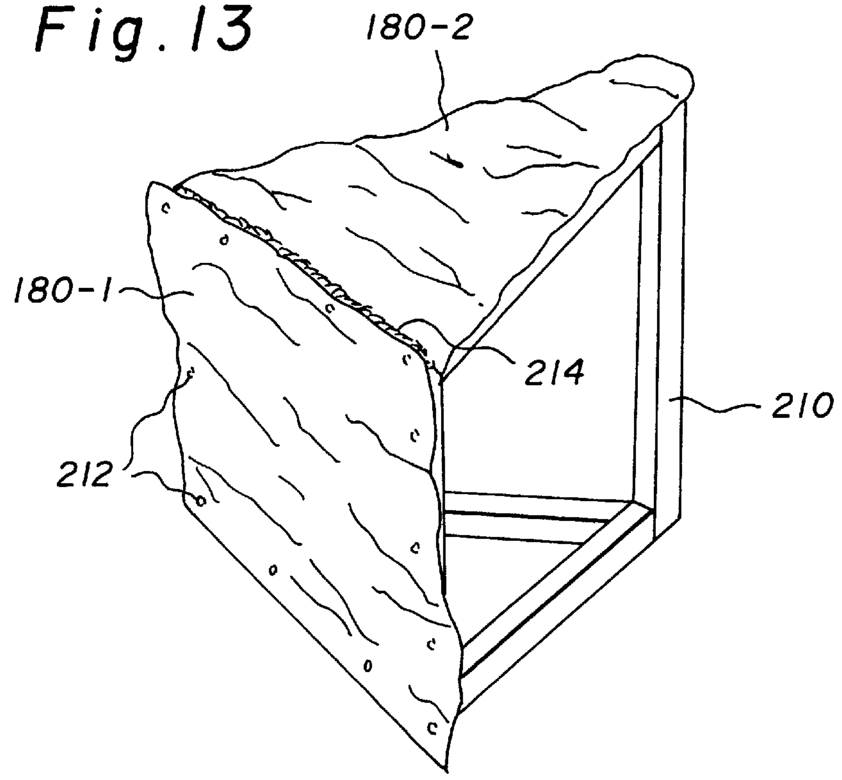
FIG. 13 is a view of FIG. 12 with side sheathing attached.
Figure 14:
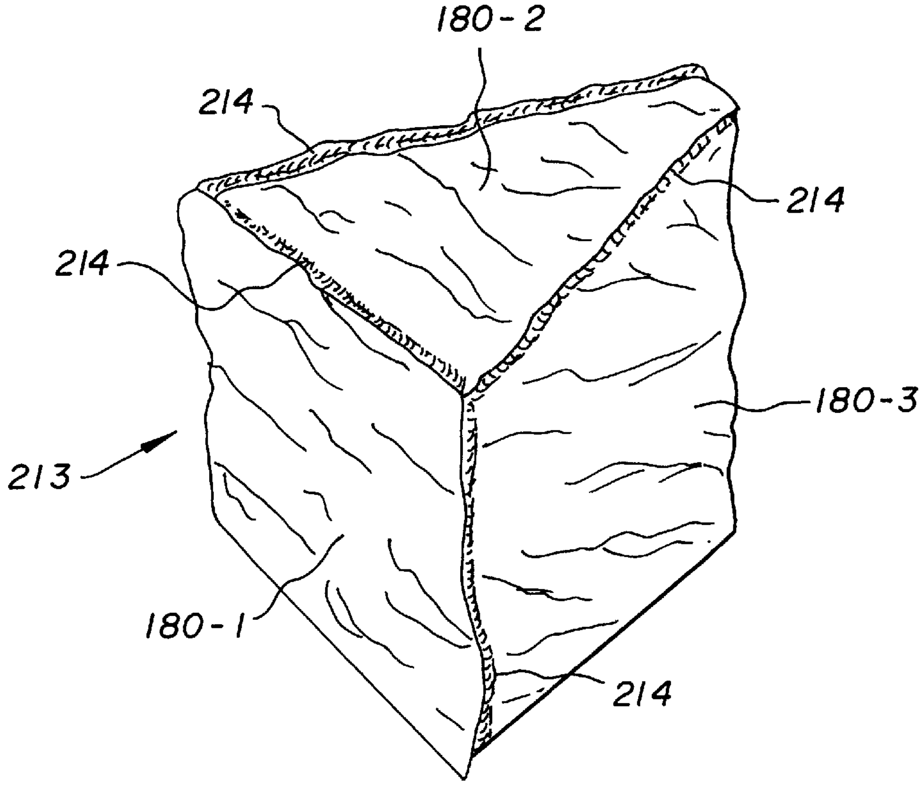
FIG. 14 is a view of FIG. 13 with further sheathing attached.

Following the placement of the first rock sheathing segment 180-1, a second segment 180-2 is mounted to another subordinate frame of the framework 210 as shown in FIG. 13. This is followed by placement of a third segment 180-3 as shown in FIG. 14 to produce a complete covering and attachment of rock sheathing 180 to the now interiorly positioned framework 210. The result is an interiorly framed custom rock or rock structure surface shell 213 with overlapped seams 214.

Figure 15:
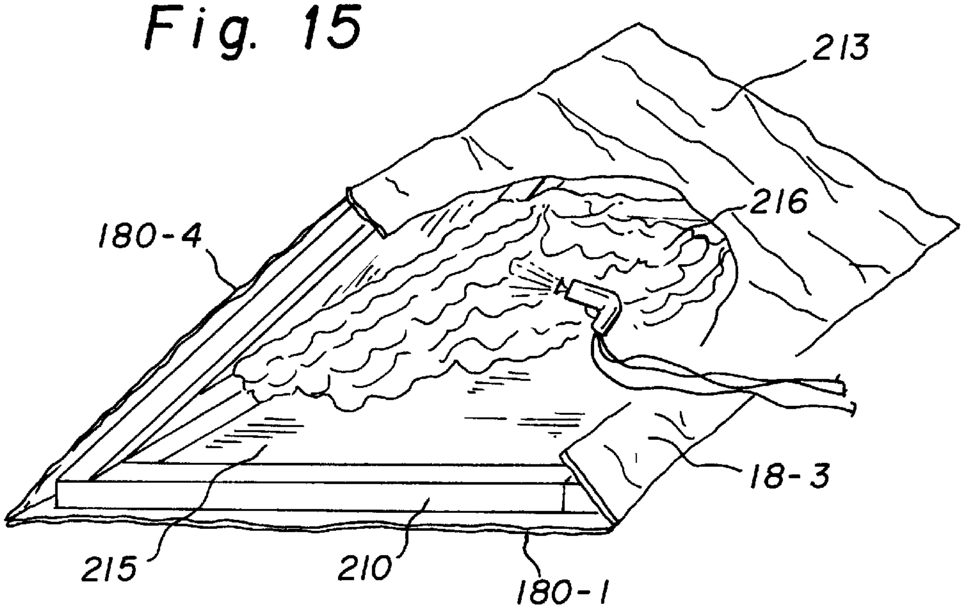
FIG. 15 is a cut-away view of FIG. 13 showing interior spraying with foam.

To further adapt the surface shell 213, as shown in the dimensional cutaway view of FIG. 15, the custom rock 213 is laid upon its side, showing the interior cavity 215, and the cavity 215 is sprayed with two-component water-blown foam 216, which desirably is fire retardant. The overlapped seam areas 214 can be sprayed first from the interior of the cavity 215 to produce a seepage seam 216' as shown in FIG. 16.

Figure 16:
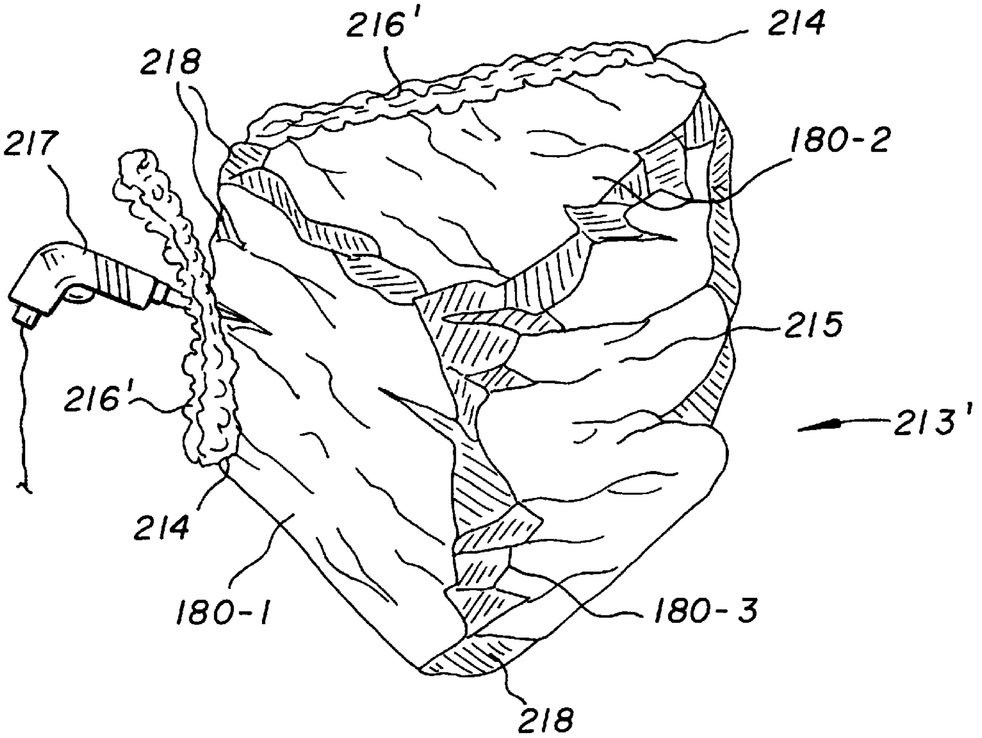
FIG. 16 is a dimensional view showing the result of the spraying conducted in FIG. 15 and the cutting away of seams to achieve desired contours.

This action seals all seams 114, and gives permanent attachment of the rock sheathing segments 180-1 through 180-3, as well as other segments 180-4 and 180-5, which are not visible in FIG. 16, to the interior framework 210. Once the seams 114 are sealed the foam 216 can completely fill the interior cavity 215 to adds stability and gives a solid sound to the resulting custom rock or rock structure 213'.

Also shown in FIG. 16 is a dimensional view of the custom rock 213) set upright so that a standard reciprocating saw 217 can cut and shape all seams 214 to achieve desired contours and shapes blending with the surface areas of the rock sheathing 180, the surfaces of which can be further controlled by the extend of foam filling of the cavity 215.

The cut areas 218 can be covered with a bonding material, such as standard automotive bond sold and marketed under the trademark and trade name "BONDO" to seal the areas where there has been oozing of the water blown foam 216. In addition the cut areas 218 can be textured with a brush or a sponge to blend with the rock sheathing segments 180-1 through 180-5. After the bonding material cures, it has produced a durable covering at the seams 214.

As a result, the process of the invention can be used to produce a class "A" fire-retardant rock or rock structure that is not limited in size or shape and can be used in all environments that require or desire custom artificial rocks or rock structures.

It should be evident that if a particular residential or commercial area wishes to make use of artificial rocks for construction and landscaping, it is desirable for the rocks to have non-identical overall contours and markings, and this is economically and easily achieved by the use of the invention. Nevertheless, the majority of the characteristic markings on the artificial rock surfaces are sufficiently similar to those of natural rock that the artificial rocks produced by the invention give the appearance of having been obtained from the same location as the natural rock source, that is, of being from the same family or set of rocks.

By the use of the present invention, the single mold 180 produced from a portion or all of the exposed surface of the natural rock 110 can used to form a large number of differently contoured artificial rocks. The artificial rocks have the appearance of coming from the same natural location inasmuch as they have common characteristic markings on their surfaces caused by formation and weathering or erosion, to which the natural rocks are subjected. Furthermore, such a family of artificial rocks are obtained in a simplified, inexpensive manner.

Furthermore, when several large rocks must be placed and fitted relative to each other to give a desired effect, a builder previously had to search for natural rocks having desired shapes. Often such rocks were difficult to find, but the invention allows the construction of frames which can meet any structural specification.

It is to be noted that the mold 180 is pliable and can be made to assume a wide variety of different orientations This not only permits the overall contour to be varied to provide differently shaped artificial rocks, as desired, but, further, enables the mold to be generally flattened out by hand and rolled up to greatly facilitates the shipment of the mold to remote areas, or even to distant cities. The framework 210 is relatively inexpensive and can be readily and economically provided at the site.

It will be appreciated that a wide variety of other materials can be used in implementing the invention.

A further illustration of using the invention is to form the sidewalls of a pool or water fall. Thus, it is possible to artificially form rocks having desired contours, surface characteristics, and orientations, in their actual location on the structure being constructed. This eliminates the need to lift and position either natural of artificial rocks and, furthermore, makes it possible to readily shape the artificial rocks so that they interfit as desired..

While illustrative products and process of the invention has been disclosed in detail, it will be evident to those of ordinary skill in the art that various modification, adaptations and adjustments may be made without departing from the spirit and scope of the invention as defined in the appended claims.

What is claimed is:

1. A method of preparing for the creation of an artificial structure which comprises the steps of:

(a) applying a mold coating to an original surface chosen for flatness and having prescribed detailing;

(b) superimposing a cradle upon said mold coating and coextensive therewith; and (c) attaching a frame to said cradle and coextensive therewith;

including the step of separating said mold coating, cradle and frame from said original surface, and applying a sheath coating to said mold coating to receive said prescribed detailing therefrom, complementing the detailing created by said original surface on said mold coating, further including the step of separating said sheath coating from said mold coating and adhering a sheathing segment to a subframe of an overall framework; and including the step of duplicating said sheath coating and adhering sheathing segments to remaining subframes of said framework to form a sheathing covered framework having a cavity therein.

2. The method of claim 1 further including the step of filling said cavity with foam to stabilize the framework structure and add weight.

3. The method of claim 2 including the step of forming said foam into seams where the sheathing segments overlap.

4. The method of claim 3 including the step of trimming said seams to form a second prescribed pattern.

* * * * *